United States Patent [19]
Kakuma et al.

[11] Patent Number: 5,487,063
[45] Date of Patent: Jan. 23, 1996

[54] POINT-TO-MULTIPOINT CONNECTION SYSTEM

[75] Inventors: Satoshi Kakuma; Shiro Uriu; Shuji Yoshimura; Yasuhiro Aso; Masami Murayama, all of Kawasaki, Japan

[73] Assignee: Fujitsu Limited, Kawasaki, Japan

[21] Appl. No.: 194,805

[22] Filed: Feb. 14, 1994

Related U.S. Application Data

[63] Continuation of Ser. No. 848,933, Mar. 10, 1992, abandoned.

[30] Foreign Application Priority Data

Mar. 19, 1991 [JP] Japan .................................. 3-055018

[51] Int. Cl.⁶ .......................... H04L 12/18; H04L 12/56; H04M 7/00
[52] U.S. Cl. ...................... 370/56; 370/60.1; 370/94.2; 370/94.3; 379/269; 379/334
[58] Field of Search ................... 370/58.2, 58.2, 370/58.3, 60, 60.1, 62, 67, 85.1, 85.13, 94.1, 94.3, 110.1, 55, 56; 379/88, 89, 93, 94, 268, 269, 284, 201, 202, 204, 333, 334

[56] References Cited

U.S. PATENT DOCUMENTS

| | | | |
|---|---|---|---|
| 4,713,806 | 12/1987 | Oberlander et al. | 370/60 |
| 4,720,850 | 1/1988 | Oberlander et al. | 370/62 |
| 4,868,812 | 9/1989 | Krüger et al. | 370/56 |
| 5,062,106 | 10/1991 | Yamazaki et al. | 370/94.1 |
| 5,121,384 | 6/1992 | Ozeki et al. | 370/60 |
| 5,130,984 | 7/1992 | Cisneros | 370/60 |

*Primary Examiner*—Alpus Hsu
*Attorney, Agent, or Firm*—Staas & Halsey

[57] ABSTRACT

A cell having an attribute of a point-to-multipoint connection is distributed to each of a number of subscribers using a point-to-multipoint connection distributing switch to be provided in parallel with a point-to-point connection, concentrating and distributing switch. Therefore, a hardware configuration can be simply established. Besides, both a point-to-point connection, and a point-to-multipoint connection can be made only by switching a cell to each switching unit, and a software configuration can thus be simplified.

5 Claims, 7 Drawing Sheets

5,487,063

1

POINT-TO-MULTIPOINT CONNECTION SYSTEM

This application is a continuation of application Ser. No. 07/848,933, filed Mar. 10, 1992, now abandoned.

BACKGROUND OF THE INVENTION

The present invention relates to a point-to-multipoint connection system used in a switching system of a broadband ISDN (Integrated Services Digital Network) in the ATM (Asynchronous Transfer Mode).

With the increasing world-wide use of data communication, other important data as well as voice data are being transmitted through public lines. Therefore, high quality data transmission and switching methods are required in future communication networks.

The broadband ISDN (B-ISDN) is a practical step in realising a communication service network for accommodating high-bit-rate data of animation images, etc. as well as voice and lower-bit-rate data, and all the interfaces in the B-ISDN are being standardized. In the B-ISDN, unlike in conventional switching systems, the ATM is used to collectively process data having different bit rates, such as voice data, low-bit-rate data animation images, etc. Besides, the B-ISDN can collectively process serial information and burst information.

In the ATM network, pieces of information in different bands are formed in fixed length data units called cells, not in conventional variable length data units called packets, and then they are transmitted and switched. Thus, in the ATM network, line data and packet data are not separated but can be collectively multiplexed in one-cell units. Therefore, data can be transmitted flexibly at a different transmission speed, and the transmission line can thus be used efficiently.

In ATM communication, subscriber data are divided into a number of parts depending on their length, provided with a header, and put into a cell. The header part of a cell comprises several bytes and its data part comprises several tens of bytes. A header is provided with a channel identifier indicating a subscriber of data contained in the cell. After subscriber information is put into a cell, the cell is multiplexed in an ATM highway, transmitted, and switched. In a switching unit, a cell is inputted from each input highway to a switch matrix, and outputted to a target output highway by being autonomously switched by each switch in the switch matrix according to the channel identifier added to the cell. (Actually, information called a tag is used).

Accordingly, a cell inputted from an input highway is outputted to one of a plurality of output highways through a switch matrix of an ATM switch. Thus, in the ATM switching method, point-to-point communication is established as a basic communication method.

However, considering that a B-ISDN using the ATM must be a switching system for efficiently processing animation data, etc. as well as voice data, point-to-multipoint communication services are required, for example, for television conferences, cable television services (CATV), etc.

The first system in the prior art technology for realizing point-to-multipoint connection is capable of establishing a point-to-multipoint connection using a switch matrix of an ATM switch.

However, in the first system, determination must be comprehensively made as to where in a switching unit a cell is copied for a point-to-multipoint connection, and the idle/busy state of each channel (time slot) used in a switching unit must be confirmed. As a result, the switching process necessarily becomes complex, thereby losing the B-ISDN's merit that collective communication can be performed at a high bit rate using a simple protocol.

In the first system, the number of channels (time slots) increases with the number of copies (distributions). Therefore, an ATM switch itself must be capable of processing increased channels. However, since a switch matrix of the ATM switch requires a hardware function for autonomously switching a cell, an additional point-to-multipoint function requires a complex hardware mechanism, thereby reducing both maintenance and operation efficiency.

The second system of the prior art technology realizes a point-to-multipoint communication service by copying an inputted cell and inputting a plurality of resultant cells to the ATM switch using a trunk provided externally for an ATM switch and exclusively used for a point-to-multipoint connection.

The second system is effective in services such as television conferences, in which information is distributed to only a limited number of subscribers. However, in such services as CATVs, where information is distributed to a number of general subscribers, it causes a problem in that the above described trunk is required for each subscriber, a large-scale switching unit must be provided, the necessary process becomes complex, and the cost greatly increases.

Besides, in a common switching network in which a central office and remote stations are connected and subscriber lines are concentrated at each remote station, the above described first and second systems of the prior art technology transmit copies of information indicating the number of subscribers between a central office and remote stations, thus resulting in wasteful transmission.

SUMMARY OF THE INVENTION

The present invention has been developed based on the above described background. An object of the present invention is to extend the scale of a switch in a switching network to provide a communication service using a point-to-multipoint connection for a number of general subscribers. The object can be attained economically by effectively using resources of conventional transmission lines and switches without complicating hardware or software configurations.

The present invention relates to a broadband ISDN switching system to be operated in an asynchronous transmission mode. It comprises one or more configuration having a central office and a plurality of remote stations for concentrating and distributing information to subscribers. Each of the remote stations comprises a distributing switch for a point-to-multipoint connection to distribute to a subscriber accommodated in the remote station a cell which has an attribute of a point-to-multipoint connection and is distributed by its central office.

The present invention in the above described configuration solves the problem that the units necessary for a point-to-multipoint connection are concentrated at a central office.

Additionally, it never complicates a hardware configuration, but adds the function of performing a point-to-multipoint connection by effectively using hardware resources of conventional remote stations.

Only a subscriber distributor must be added corresponding to each subscriber just like a building block in a point-to-multipoint connection distributing switch when the number of subscribers accommodated in each remote station increases.

Besides, the present invention simplifies the management of idle channels of each switch in a remote station, and adds a function of performing a point-to-multipoint connection without complicating the software configuration.

The present invention also enables efficient use of a transmission line in combination with a conventional distributing system for distributing a cell having the attribute of a point-to-multipoint connection using an exclusive trunk.

Since the present invention simplifies hardware and software configurations as described above, a switching system can be provided with a function of performing a point-to-multipoint connection together with desirable maintenance and operational features.

BRIEF DESCRIPTION OF THE DRAWINGS

Other objects and features of the present invention can be easily recognized by referring to the attached drawings and the description of preferred embodiments.

DESCRIPTION OF THE PREFERRED EMBODIMENTS

Explanation of the Principle

Figure 1:
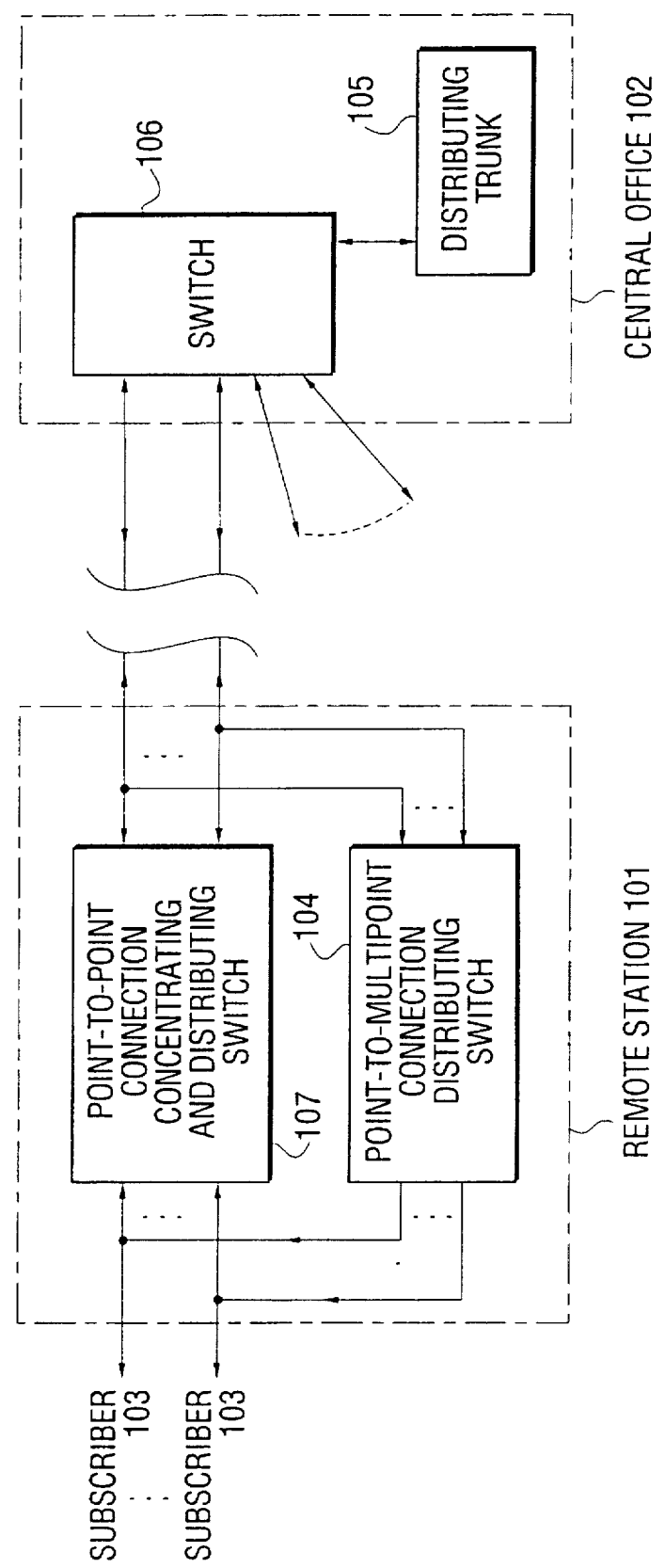
FIG. 1 is a principle block diagram for explaining the present invention.

FIG. 1 is a principle block diagram for explaining the present invention.

The present invention is a switching system in a broadband ISDN used in an asynchronous transfer mode, It relates to a switching system comprising one or more configuration in which a plurality of remote stations 101 for concentrating and distributing information from and to subscribers 103 are accommodated in a central office 102.

In each of the remote stations 101, a point-to-multipoint connection distributing switch 104 for distributing a cell having an attribute of a point-to-multipoint connection is provided by the central office 102 to any subscriber 103 accommodated in the remote station 101. That is, the point-to-multipoint connection distributing switch 104 is provided in parallel with a point-to-point connection concentrating and distributing switch 107 which is generally provided in the remote station 101 for switching a common cell having an attribute of a point-to-point connection. An inputted cell is either switched by the point-to-point connection concentrating and distributing switch 107 or distributed by the point-to-multipoint connection distributing switch 104 depending on whether or not a VCI (Virtual Channel Identifier)/VPI (Virtual Path Identifier) added to each of the inputted cells matches a VCI/VPI specified by the central office for use in a point-to-multipoint connection.

Additionally, the present invention can be configured such that a distributing trunk 105 is provided in the central office 102. The distributing trunk 105 distributes a cell, which has an attribute of a point-to-multipoint connection and is transmitted from a subscriber, to each of the remote stations 101 accommodated in the central office 102 or to another central office through a switching unit 106 in the central office 102.

In the present invention, a cell having an attribute of a point-to-multipoint connection is actually distributed to each of the subscribers 103 by the remote station 101, not by the central office 102. Therefore, the present invention can solve the problem of a system configuration for point-to-multipoint connections being concentrated at the central office 102.

The point-to-multipoint connection distributing switch 104 provided in the remote station 101 is not an improved type of common point-to-point connection concentrating and distributing switch 107, but is added to its switching part. Therefore, a point-to-multipoint connection function can be added effectively using conventional hardware resources of a remote station without complicating the hardware configuration.

In this case, only a subscriber correspondent must be added just like a building block in a point-to-multipoint connection distributing switch 104 when the number of subscribers 103 accommodated in each of the remote stations 101 increases.

A controller in the remote station 101 identifies the VCI/VPI of a cell transmitted from the central office 102 to realize a point-to-point connection and a point-to-multipoint connection only by distributing a cell either to a point-to-point connection concentrating and distributing switch 107 or to a point-to-multipoint connection distributing switch 104. Therefore, idle channels in the switches 104 and 107 in the remote station 101 can be easily managed, and a point-to-multipoint connection function can be added without complicating the software configuration.

In addition to the above described configuration, a cell having an attribute of a point-to-multipoint connection can be distributed from the central office 102 to each of the remote stations 101 or to another central office by the exclusive distributing trunk 105 provided in the central office 102. Thus, the present invention enables effective use of a transmission line in combination with a conventional distributing system for distributing a cell having an attribute of a point-to-multipoint connection using an exclusive trunk.

Explanation of Preferred Embodiments

Preferred embodiments of the present invention are described in detail by referring to the attached drawings.

Figure 2:
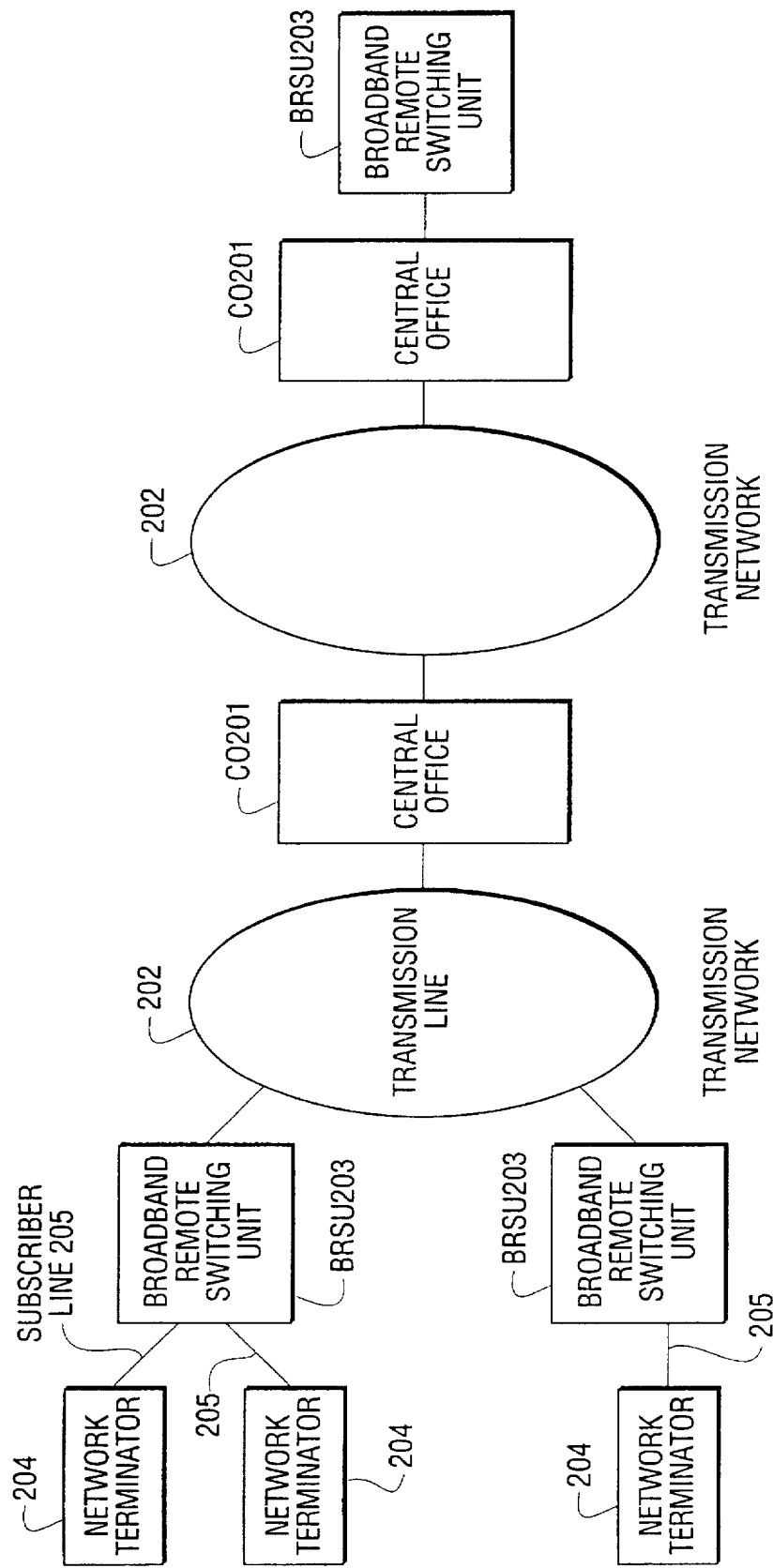
FIG. 2 shows the general configuration for explaining the B-ISDN network using an ATM.

FIG. 2 shows the general configuration for explaining the B-ISDN operated in an ATM in the present invention.

The B-ISDN has a configuration comprising a central office (CO: Central Office) 201 and a remote concentrator (BRSU: Broadband Remote Switching Unit) connected through a transmission line 202 of optical fiber.

A BRSU 203 concentrates and distributes subscriber information (cells) inputted and outputted to and from each of the subscriber lines 205 connected to a network terminator (NT) 204 for each subscriber, and transmits to and from the CO 201 communication data generated by multiplexing subscriber information for a predetermined number of subscribers. The BRSU 203 also switches subscriber information among local subscribers connected to it.

The CO 201 switches subscriber information to be transmitted among subscribers each connected to a different station. The network configuration described above is also used in common telephone networks, etc. as well as in B-ISDN networks operated in an ATM, and enables an efficient switching operation.

Figure 3:
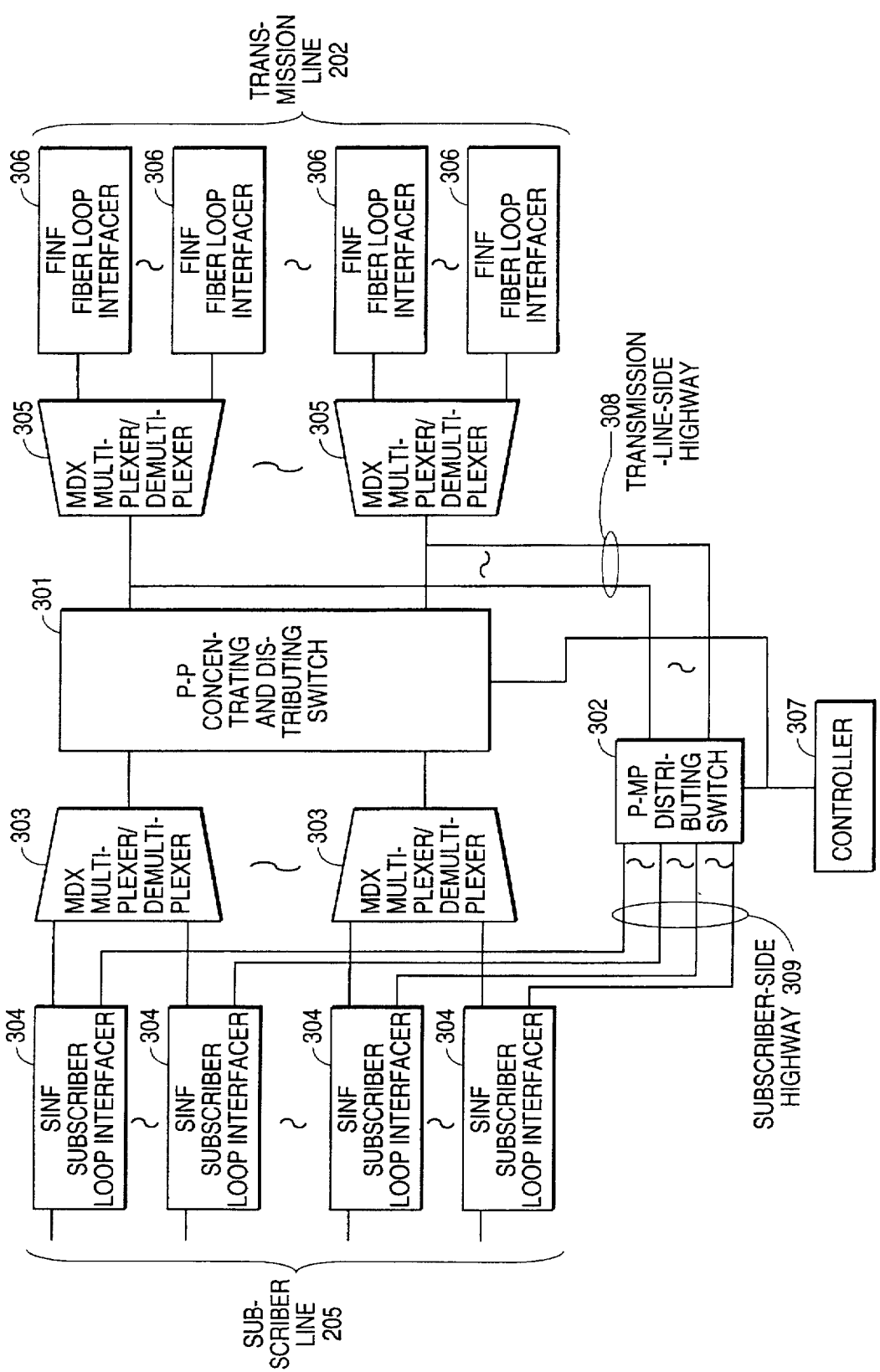
FIG. 3 shows the configuration of the BRSU in a preferred embodiment of the present invention.

FIG. 3 shows the configuration of a preferred embodiment of the BRSU 203 shown in FIG. 2.

The transmission line 202 connected to the CO 201 shown in FIG. 2 is concentrated by a multiplexer/demultiplexer (MDX) 305 through a transmission line interface 306 (FINF: Fiber Loop Interfacer 306), and connected to a P-P concentrating and distributing switch 301 through a transmission-line-side highway 308. The subscriber line 205 connected to the NT 204 shown in FIG. 2 is concentrated by an MDX 303 through a subscriber line interface 304 (SINF: Subscriber Loop Interfacer), and then connected to the P-P concentrating and distributing switch 301. The P-P concentrating and distributing switch 301 switches a cell having an attribute of a point-to-point connection. The configuration so far is the same as that of the conventional BRSU 203.

In the present preferred embodiment, a P-MP (Point-to-Multipoint) distributing switch 302 for performing a point-to-multipoint connection is provided in parallel with the P-P (Point-to-Point) concentrating and distributing switch 301 for performing the point-to-point connection.

That is, the P-MP distributing switch 302 distributes a cell, which has an attribute of a point-to-multipoint connection and is inputted from the transmission-line-side highway 308 connected to each MDX 305, to each subscriber from each subscriber-side highway 309 through each of the SINFs 304 and the subscriber lines 205. A cell having an attribute of a point-to-multipoint connection stores a CATV signal for a plurality of channels from a specific distributor.

The controller 307 controls the P-P concentrating and distributing switch 301 and the P-MP distributing switch 302 according to a call issued by a subscriber. That is, the controller 307 specifies for the P-P concentrating and distributing switch 301 a VCI (virtual channel identifier)/VPI (virtual path identifier) of a subscriber involved in a point-to-point connection among subscribers accommodated by the corresponding BRSU 203. Thus, the P-P (Point-to-Point) concentrating and distributing switch 301 switches a cell having a specified VCI/VPI for Point-to-Point connection. The controller 307 also specifies for the P-MP (Point-to-Multipoint) distributing switch 302 a VCI/VPI of a subscriber involved in a point-to-multipoint connection. Thus, the P-MP (Point-to-Multipoint) distributing switch 302 switches for a corresponding subscriber a cell having the specified Point-to-Multipoint VCI/VPI.

Figure 4:
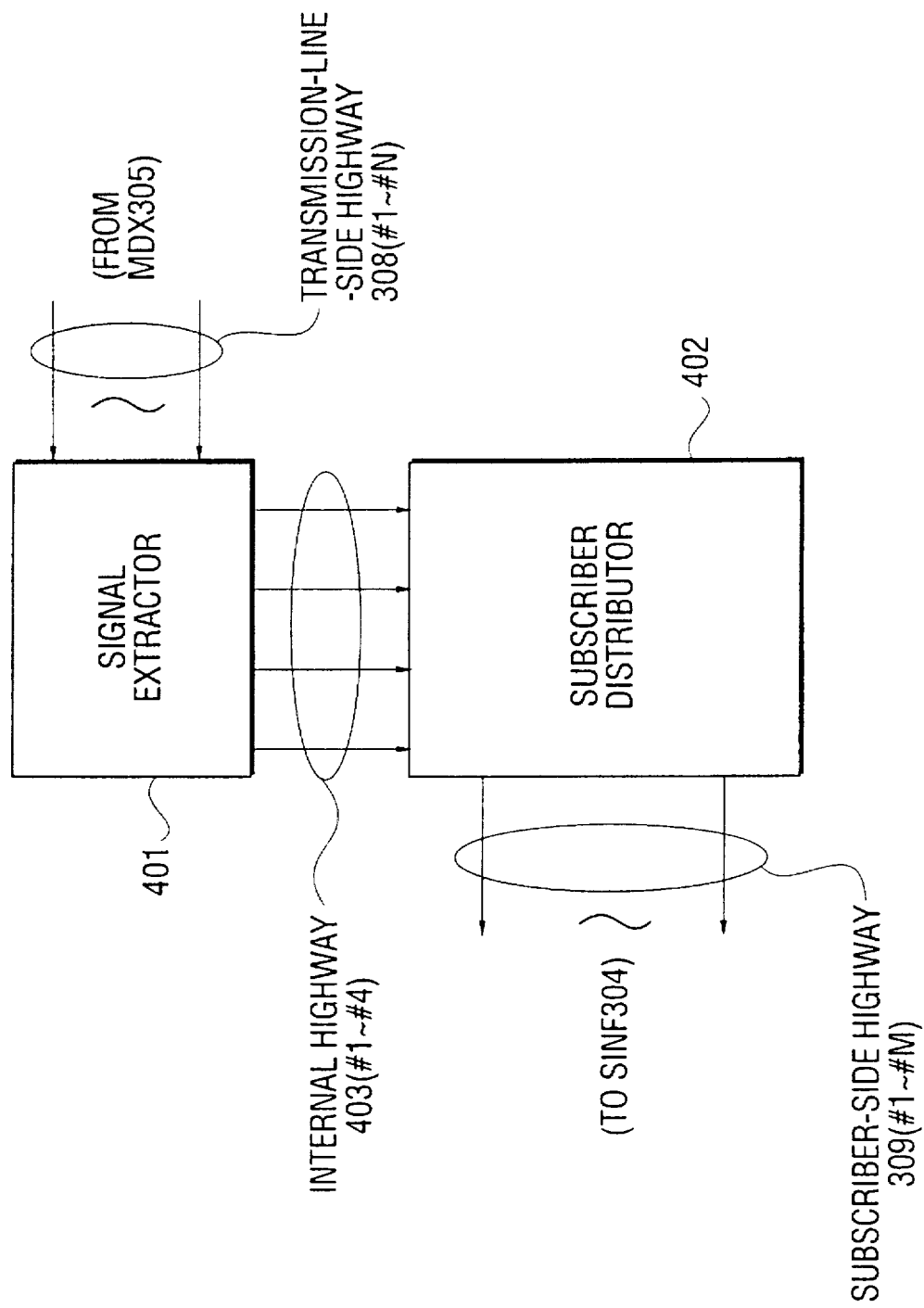
FIG. 4 shows the configuration of a distributing switch.

FIG. 4 shows the configuration of the P-MP distributing switch 302 shown in FIG. 3. A signal extractor 401 extracts a cell which has an attribute of a point-to-multipoint connection and stores a CATV signal inputted by the transmission-line-side highway 308, and then multiplexes it to internal highways 403. A subscriber distributor 402 distributes a cell which has an attribute of a point-to-multipoint connection and is multiplexed to the internal highways 403 from each of the subscriber-side highway 309 to each subscriber through each SINF 304 (FIG. 3).

Figure 5:
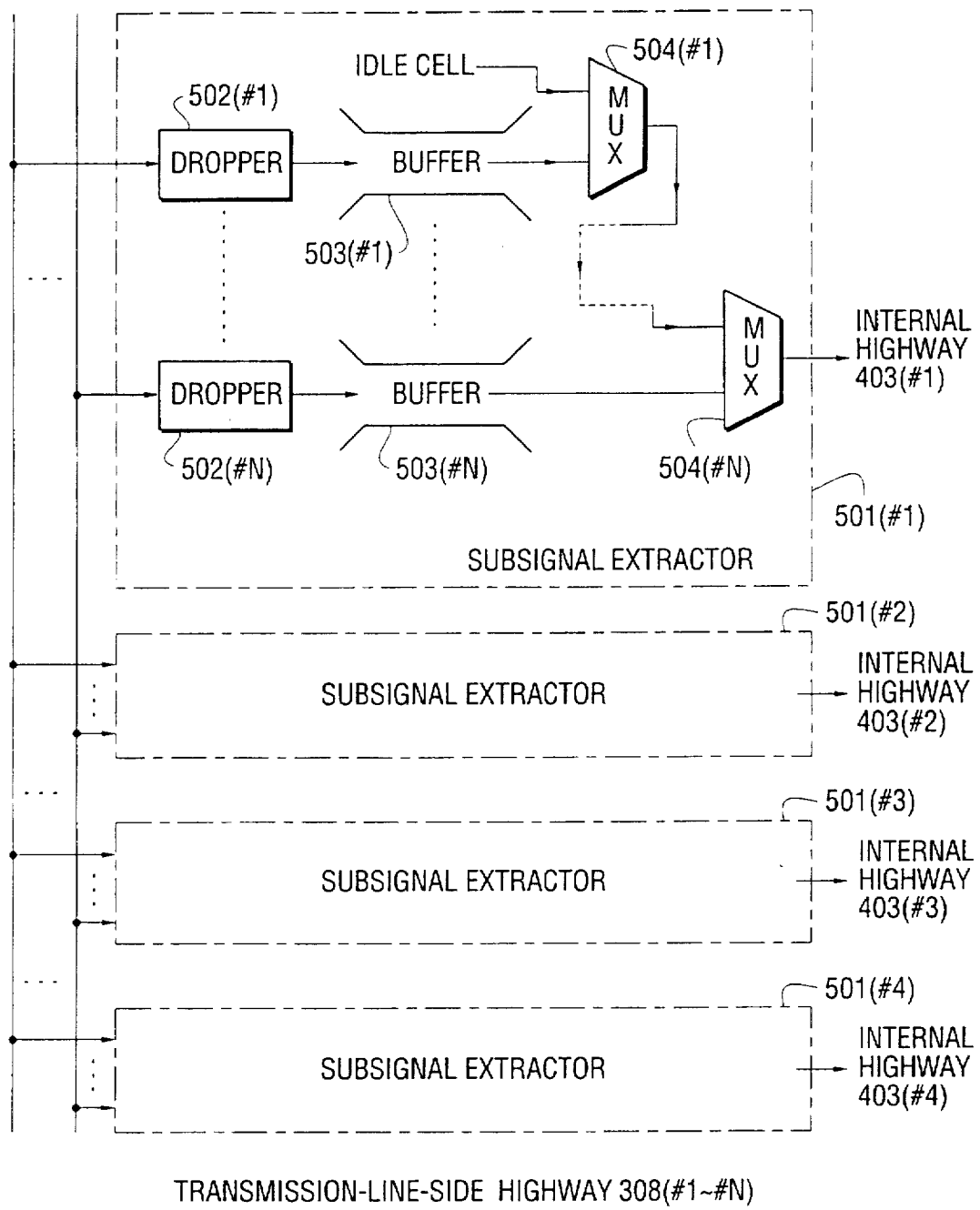
FIG. 5 shows the configuration of a signal extractor.

FIG. 5 shows the configuration of the signal extractor 401 shown in FIG. 4. The signal extractor 401 extracts a cell, which is inputted from N lines of transmission-line-side highway 308 (#1–#N) and stores a CATV signal, and multiplexes it to internal highways 403.

The internal highway 403 has a transmission speed of 1.2 Gbps (gigabit/second). Since a one-channel CATV signal requires a transmission speed of 30–40 Mbps (megabits/second), one internal highway 403 can transmit at least 30 channels of CATV signals. Therefore, 120 channels of CATV signals can be retrieved by 4 lines of internal highways 403 (#1–#4) if 120 channels of CATV signals are inputted through N lines of transmission-line-side highway 308 (#1 –#N). The number N of the transmission-line-side highways 308 is determined by the maximum number M of subscribers accommodated in one BRSU 203 (FIG. 2) and the concentration ratio "r" of the BRSU 203, resulting in N=M/r.

Each of four subsignal extractors 501 (#1–#4) shown in FIG. 5 extracts from the transmission-line-side highways 308 (#1–#N) a cell which stores 30 specific channels of CATV signals, and then multiplexes it to one internal highway 403. In this case, each of the subsignal extractors 501 extracts a cell which stores 30 channels of CATV signals, and four subsignal extractors 501 extract cells which store a sum of 120 channels of CATV signals.

That is, in each subsignal extractor 501, N droppers 502 (#1–#N) are provided each corresponding to a transmission-line-side highway 308 (#1–#N). Each of the droppers extracts from cells transmitted through transmission-line-side highways 308 a cell having a VCI (virtual channel identifier)/VPI (virtual path identifier) corresponding to 30 specific channels of CATV signals, and then temporarily stores one in each of the buffers 503 (#1–#N). 30 VCIs/VPIs are specified for each dropper 502 by the controller 307 shown in FIG. 3 corresponding to 30 specific channels of CATV signals. The dropper 502 is a well-known circuit for use in an ATM switching method.

A cell having VCIs/VPIs each corresponding to each of 30 specific channels of CATV signals temporarily stored in each of the buffers 503 (#1–#N) is sequentially multiplexed to one internal highway 403 at a timing of an idle cell. When no cells are outputted from any of the buffers 503 at a certain cell timing, an idle cell is multiplexed by the MUX 504 #1. In multiplexing a cell by each of the MUX 504, a conflict is controlled in executing an ATM switching method.

Figure 6:
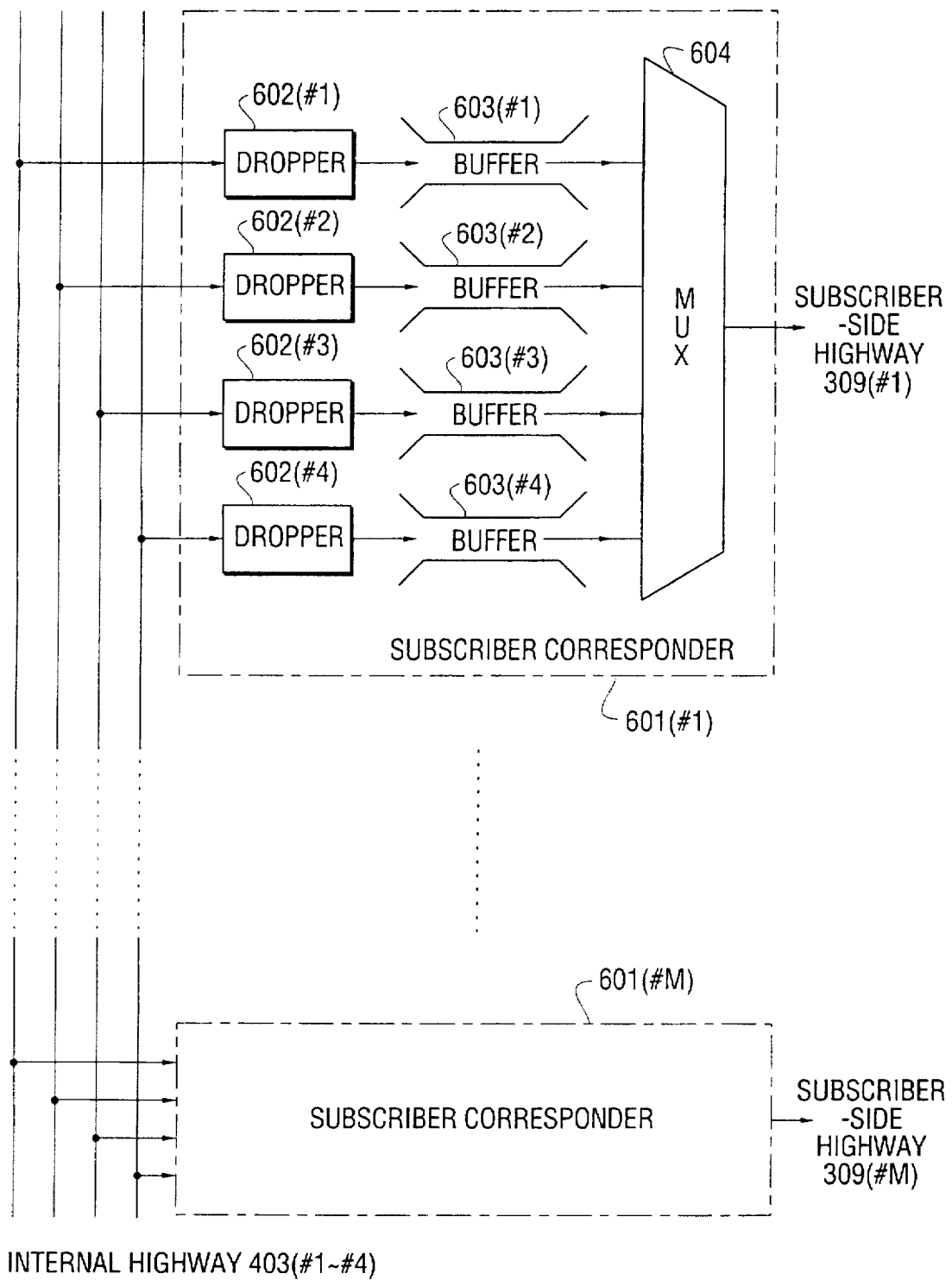
FIG. 6 shows the configuration of a subscriber distributor.

FIG. 6 shows the configuration of the subscriber distributor 402 shown in FIG. 4. The subscriber distributor 402 distributes to each of the subscriber-side highways 309 (#1–#M) a cell which has an attribute of a point-to-multipoint connection and is multiplexed to four internal highways 403 (#1–#4).

Assuming that the subscriber line 205 (refer to FIG. 2 or 3) is operated at a transmission speed of 155 Mbps, a subscriber can be provided with about four channels of CATV signals because one-channel CATV signal requires a transmission speed of 30–40 Mbps as described above.

A subscriber corresponder 601 shown in FIG. 6 is provided corresponding to each subscriber. That is, assuming that the number of subscribers accommodated in one BRSU 203 is "M", M subscriber corresponders 601 (#1–#M) are provided. When the number of subscribers accommodated in the BRSU 203 increases, the subscriber corresponder 601 shown in FIG. 6 is parallelly added like a building block. Each of the subscriber corresponders 601 extracts from each of the internal highways 403 (#1–#4) a cell which stores the subscriber-requested number (four channels at maximum) of channels of CATV signals, and then multiplexes it to a subscriber-side highway 309.

That is, in each of the subscriber corresponders 601, four droppers 602 (#1–#4) are provided corresponding to each of the internal highways 403 (#1–#4). Each dropper extracts from the cells transmitted through each of the internal highways 403 a cell having a VCI/VPI corresponding to a CATV signal of a subscriber-specified channel, and then temporarily stores it in each of the buffers 603 (#1–#4). At a subscriber's request on issuing a call, the controller 307 shown in FIG. 3 specifies up to four VCIs/VPIs corresponding to up to four channels for CATV signals. The specified VCIs/VPIs are stored in each of the droppers 602 in the subscriber corresponder 601 corresponding to the subscriber. A subscriber issues a request for a CATV channel using a protocol LAPD (Link Access Protocol D) commonly used in an ATM switching process.

A cell having a VCI/VPI corresponding to specific channels of CATV signals temporarily stored in each of the buffers 603 (#1–#4) is sequentially multiplexed to idle cell positions of one subscriber-side highway 309 by a MUX 604.

Thus, each cell corresponding to up to four channels of CATV signals is multiplexed to each of the subscriber-side highways 309, and then inputted to each of the SINFs 304 shown in FIG. 3. Each SINF 304 multiplexes a cell which has an attribute of a point-to-point connection, stores a CATV signals, and is multiplexed to each of the subscriber-side highways 309, and a common point-to-point connection cell inputted from the P-P concentrating and distributing switch 301 through the MDX 303. Then, it sends these multiplexed cells to each of the subscriber lines 205 and transmits them to each subscriber.

Figure 7:
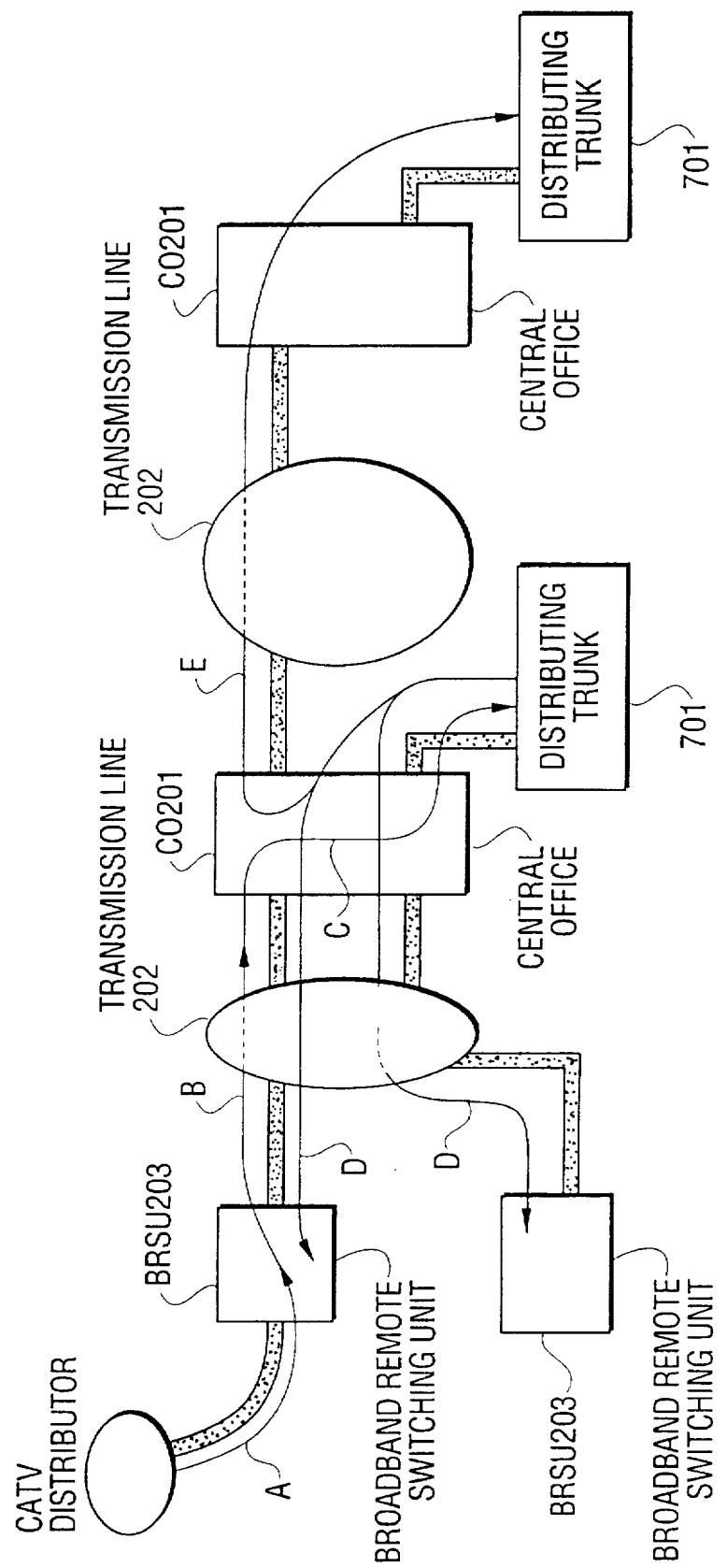
FIG. 7 shows a distribution path of a CATV signal.

FIG. 7 shows the distribution path of CATV signals in a preferred embodiment shown in FIGS. 2 of the present invention.

Information for public subscribers such as CATV signals should be distributed in the same manner as a subscriber sends information to a network in a switching network. In the present preferred embodiment, a CATV signal distributor is processed as a subscriber, and it is accommodated by one BRSU 203 shown in FIG. 2.

Then, a cell containing a CATV signal which is sent by the CATV distributor is inputted through path A in FIG. 7 to the BRSU 203 shown in FIG. 2 and accommodates the CATV distributor. The CO 201 is provided with a distributing trunk 701 (well-known as a prior art technology) for distributing to the BRSU 203 accommodated in the CO 201 as shown in FIG. 7 or to another CO 201 a cell having an attribute of a point-to-multipoint connection.

The distributing trunk 701 copies a cell containing a CATV signal to be involved in the above described point-to-multipoint connection. Each of the resultant cells is distributed to the BRSU 203 contained in the CO 201 and to another CO 201 through the transmission line 202. In another CO 201, the above described cell is copied by a distributing trunk 701 contained in the CO, and resultant cells are distributed to the BRSU 203 contained by the CO.

As described above, the BRSU 203 identifies a cell containing a CATV signal having an attribute of a point-to-multipoint connection by determining the VCI/VPI of each cell inputted through the transmission line 202. Then, it distributes the cell to each subscriber through the P-MP distributing switch 302 (FIG. 3).

What is claimed is:

1. A point-to-multipoint connection system using a broadband ISDN switching system to be operated in an asynchronous transfer mode, said connection system having one or more configurations in which a plurality of remote stations for concentrating and distributing data from and to subscribers are accommodated from a central office, said connection system comprising:

point-to-point connection concentrating and distributing switch means, in each of said remote stations, for receiving ATM cells and for concentrating, switching and distributing to a subscriber accommodated in each remote station a first cell having an attribute of a point-to-point broadband asynchronous transfer mode connection among the received ATM cells and which is distributed from the central office, and point-to-multipoint connection distributing switch means, provided in parallel with said point-to-point connection concentrating and distributing switch means in each of said remote stations, for receiving the ATM cells and for switching and distributing to one or more subscribers accommodated in each remote station a second cell which has an attribute of a point-to-multipoint connection among the received ATM cells and which is distributed from the central office.

2. A point-to-multipoint connection system according to claim 1, wherein said point-to-multipoint connection distributing switch means is provided in each remote station in parallel with said point-to-point connection concentrating and distributing switch means for distributing to a subscriber accommodated in said remote station a cell which has an attribute of a point-to-point connection and is distributed by said central office.

3. A point-to-multipoint connection system according to claim 1, wherein each remote station includes means for making a determination as to whether a cell distributed by said central office is distributed to said point-to-point connection concentrating and distributing switch means or to said point-to-multipoint connection distributing switch means, by determining whether or not a virtual identifier added to said cell matches a virtual identifier specified for a point-to-multipoint connection by said central office.

4. A point-to-multipoint connection system according to claim 1, wherein said point-to-multipoint connection distributing switch means comprises:

signal extracting means for extracting from at least one remote station-side transmission line connected to said central office for a group of internal transmission lines a cell provided with any of virtual identifiers assigned to said internal transmission line, and for providing said cell to said internal transmission line; and subscriber distributing means for extracting from each of said internal transmission lines for a subscriber-side transmission line connected to each of said subscribers a cell provided with at least one virtual identifier assigned to said subscriber-side transmission line, and for providing said cell to said subscriber-side transmission line.

5. A point-to-multipoint connection system according to claim 1, wherein said central office comprises distributing trunk means for distributing a cell which has an attribute of a point-to-multipoint connection and is transmitted from a subscriber to each remote station accommodated by said central office or to another central office through a switching means in said central office.

\* \* \* \* \*